Jan. 28, 1964 E. C. BAROCELA 3,119,300
MOTION PICTURE PROJECTOR
Filed Feb. 13, 1961 5 Sheets-Sheet 1

INVENTOR
Edward Barocela

BY Karl W. Flocks
ATTORNEY

Jan. 28, 1964  E. C. BAROCELA  3,119,300
MOTION PICTURE PROJECTOR
Filed Feb. 13, 1961  5 Sheets-Sheet 2

INVENTOR
Edward Barocela

BY Karl W. Flocks
ATTORNEY

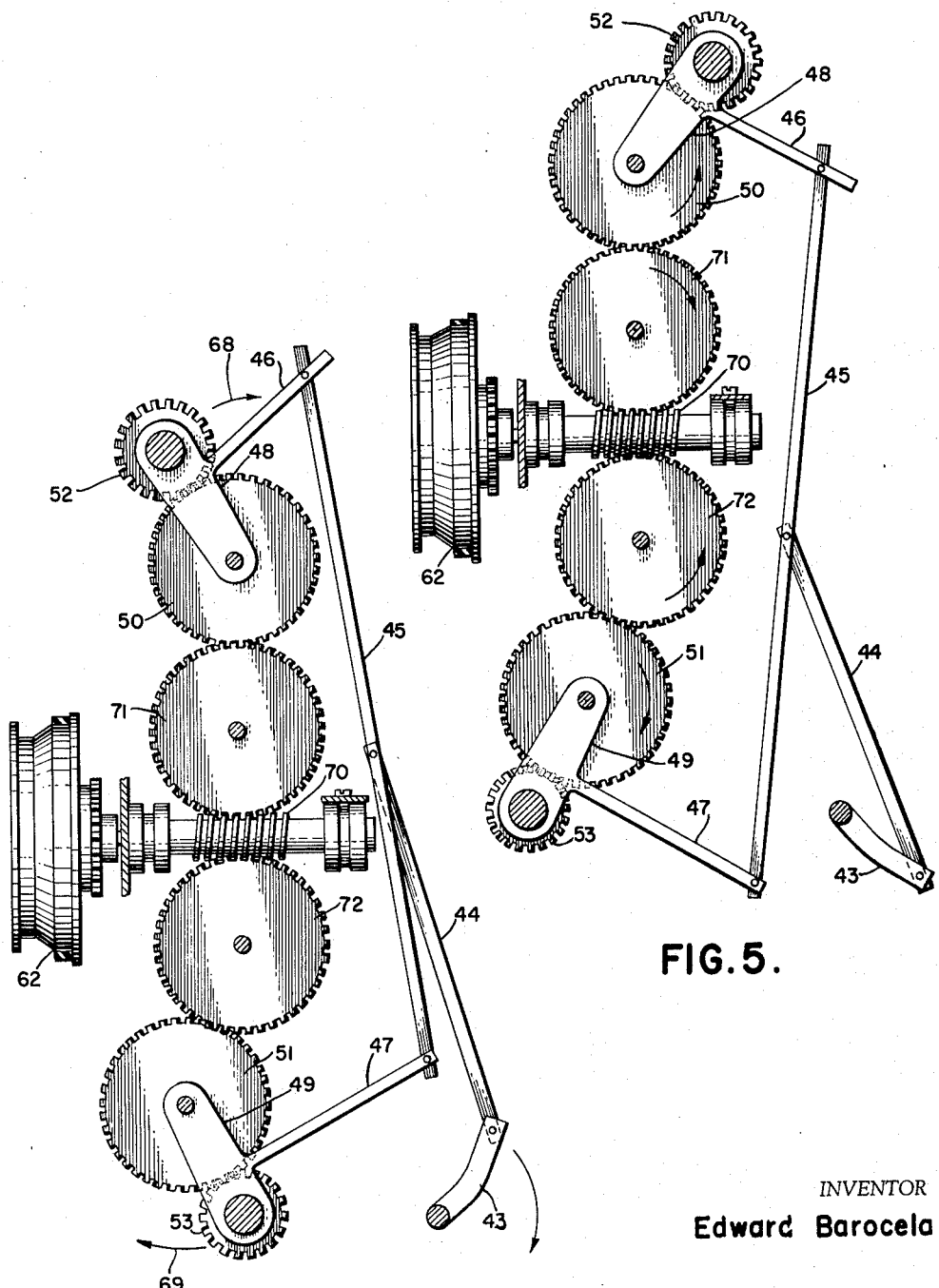

Jan. 28, 1964   E. C. BAROCELA   3,119,300
MOTION PICTURE PROJECTOR
Filed Feb. 13, 1961   5 Sheets-Sheet 4

INVENTOR
Edward Barocela

BY KARL W. FLOCKS
ATTORNEY

Jan. 28, 1964 E. C. BAROCELA 3,119,300
MOTION PICTURE PROJECTOR
Filed Feb. 13, 1961 5 Sheets-Sheet 5

INVENTOR
Edward Barocela

BY Karl W. Flocks
ATTORNEY

United States Patent Office 3,119,300
Patented Jan. 28, 1964

3,119,300
MOTION PICTURE PROJECTOR
Edward C. Barocela, Camp Springs, Md., assignor to Saginaw Insurance Agency, Silver Spring, Md.
Filed Feb. 13, 1961, Ser. No. 93,285
5 Claims. (Cl. 88—17)

The present invention relates to motion picture projectors and has particular reference to an improved and simplified means of threading a projector.

In the handling of motion picture projectors, difficulty is often experienced in the correct threading of the film by inexperienced persons operating the projector. If this threading is not done correctly, film may be torn, spoiling irreplaceable pictures or at the very least interrupting or delaying the showing of the film.

Accordingly, the present invention is directed to apparatus that simplifies the threading of a motion picture projector.

The present invention provides for straight-line threading of motion picture projectors.

Therefore, it is the object of this invention to provide a device which forms the necessary loops in motion picture film for proper operation of a projector while automatically anad simultaneously bringing the film into contact with the sprockets, aperture plate, and sound drum assembly.

In this new invention the correct size of loops in the film are formed automatically without leaving it to the discretion or experience of the operator.

Furthermore, it is an object of this invention to provide for the threading of a motion picture projector in almost a single operation instead of the many separate motions required by projectors in the prior art.

Other objects and the nature and advantages of the instant invention will be apparent from the following detailed description, taken in conjunction with the accompanying drawings, wherein:

FIGS. 4 and 5 are the gear train used with some embodiments of the invention in the threading and operating positions respectively.

Figure 1:
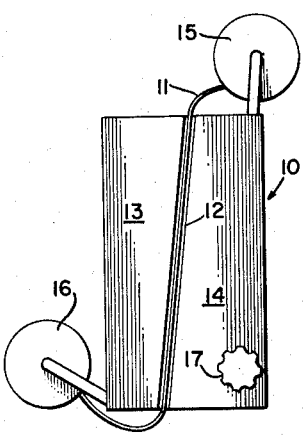
FIG. 1 is a possible form for the outer casing of a motion picture projector embodying the present invention.

Referring first to FIG. 1 there is illustrated the section 10 through which film strip 11 is loaded in slot 12 between the adjacent walls of covers 13 and 14 enclosing the mechanism of section 10 of the projector. Film strip 11, unwound from the supply reel 15 and attached to the takeup reel 16 or prior to attachment thereto, is placed in slot 12. Control knob 17 is then turned in a clockwise direction and the film strip 11 is automatically threaded and ready for operation. A microswitch may be connected so that upon a full clockwise turn to the limit of its setting the control knob 17 will start a motor to operate the motion picture projector for the display of the film 11 on a regular motion picture screen and also operate the sound portion of the projector when the projector is of such a type as to incorporate sound on the film 11.

Figure 2:
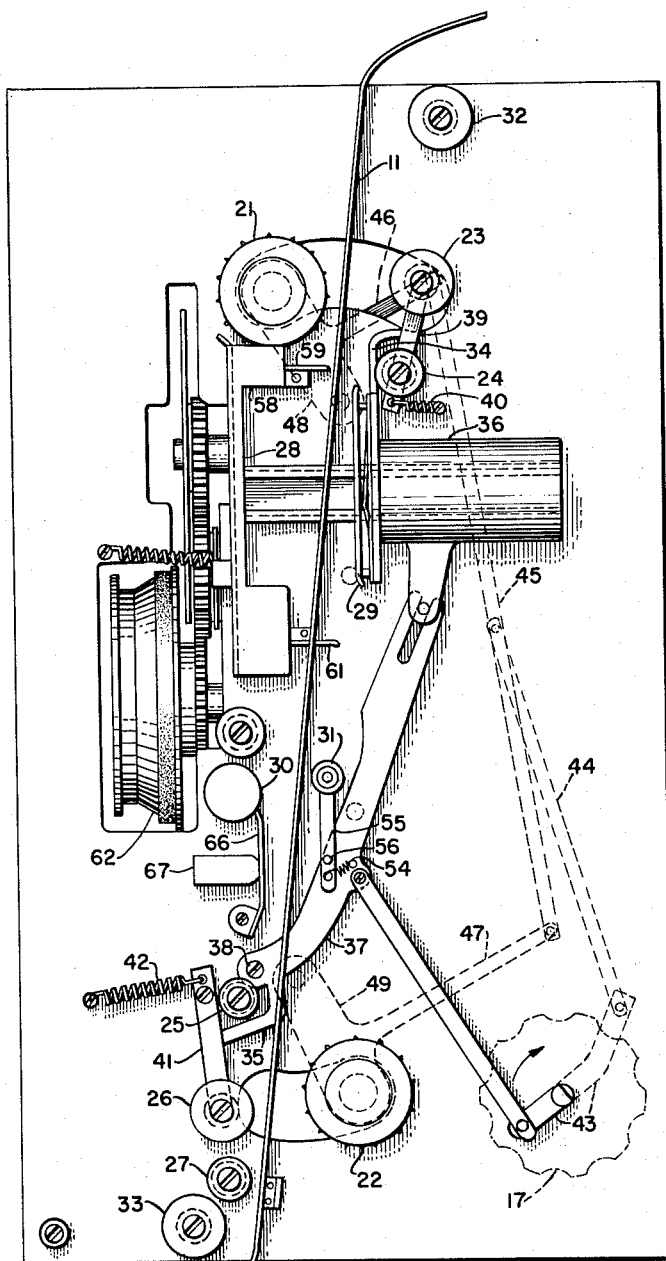
FIG. 2 is a side elevational view of an embodiment of the present invention with the covers removed and the mechanism in the threading position.

FIGURE 2 shows the operating mechanism in one embodiment of the present invention. In this side elevational view the covers 13 and 14 have been removed exposing some of the operating mechanism to view. The threading position of the mechanism as shown in this figure illustrates the position of the parts of the projector at the beginning of the threading action. In this position the film 11 being loaded through slot 12 is thereby placed between sprocket 21 and adjacent rollers 23 and 24 in the upper part of the projector, and sprocket 22 and adjacent rollers 25, 26 and 27 in the lower part of the projector. This placement of film 11 in slot 12 also causes the positioning of film 11 between aperture plate 28 and pressure plate 29. Film 11 also lies between the sound stabilizer drum 30 and the pressure roller 31. In this loading or threading position film 11 will run freely over rollers 32 and 33, from the supply reel 15 to the takeup reel 16. Although film 11 is very flexible and will run over rollers 32 and 33, it has been depicted in FIG. 2 as lying in a straight line so as to better illustrate the straight line loading that is possible with the device of this invention. Rollers 23 and 26 are kept in a position out of contact with film 11 by means of extensions 34 and 35 attached to lens holder 36 and arm 37, respectively.

At the beginning of the threading operation after loading film 11 in slot 12, as control knob 17 is rotated, swinging arm 37, which is pivoted at point 38, moves lens holder 36 in the direction of aperture plate 28, thereby causing extension 34 to release the arm 39 on which roller 23 is mounted. Roller 23, by means of the action of tension spring 40 on arm 39, moves toward sprocket 21 and engages film 11 and presses it against the sprocket 21. At the same time, the linkage connected from control knob 17 and moving swinging arm 37 allows extension 35 to release arm 41 upon which roller 26 is mounted, thereby causing roller 26 to move toward sprocket 22 by means of the action of tension spring 42 on arm 41 and engage film 11 in cooperation with sprocket 22.

As the operator continues to rotate control knob 17, two different actions take place simultaneously. The lens holder 36 and the rollers 23 and 26 move as described above, while the sprockets 21 and 22 are also moved by the combined action of the lever arm 43 and linkages 44 and 45 and levers 46 and 47 attached to the arms 48 and 49, respectively. These arms are pivoted on the turning axes of gears 50 and 51 so that pinions 52 and 53 ride over the teeth of the gears 50 and 51, respectively, thus making the sprockets 21 and 22, each of which is attached to one of pinions 52 or 53, turn in a clockwise direction so that the teeth on the sprockets 21 and 22 engage in the perforations of film 11. By the action of the rollers 23 and 26, the film is pulled from take-up and supply reels 15 and 16, respectively, and pushed in a downward direction by sprocket 21 and an upward direction by sprocket 22, thus causing film 11 to slacken, and thereby provide the necessary length of film for the subsequent formation of required loops to prevent the breaking or tearing of the film during operation of the projector.

Figure 3:
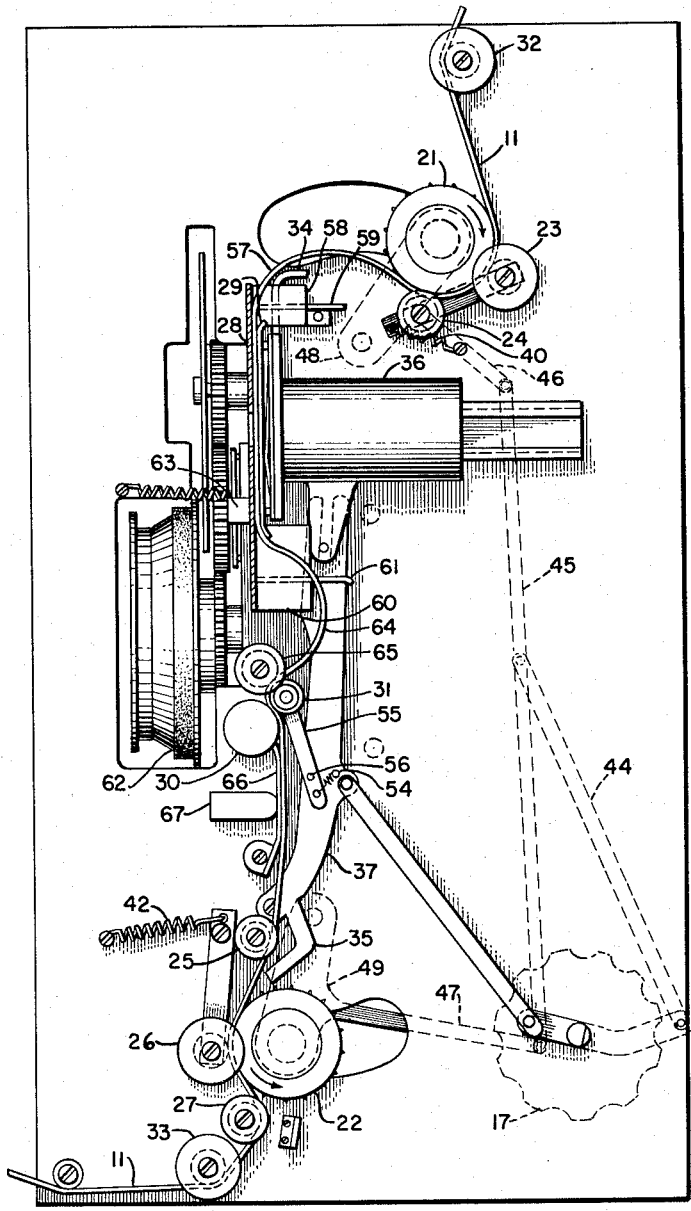
FIG. 3 is the embodiment shown in FIG. 2 with the mechanism in an operating position.

While sprockets 21 and 22 act on film 11 in the manner described, the lens holder 36 and the arm 37 move toward the position shown in FIG. 3, and in so doing, film 11 is engaged between aperture plate 28 and pressure plate 29, and also between sound stabilizer drum 30 and the pressure roller 31. Pressure roller 31 is held against sound drum 30 by means of the tension spring 54 which is attached to arm 55 and causes arm 55 to pivot at point 56. Due to the combined action of sprockets 21 and 22, pressure plate 29 and pressure roller 31, film 11 is forced to form a loop 57 between upper sprocket 21 and aperture plate 28. Another loop is formed between lower sprocket 22 and pressure roller 31. This loop is formed only as an intermediate step and does not show in the figures since it is no longer present during the operating positioning of the mechanism of the projector. Film 11 is positioned properly in the film channel of aperture plate 28 by means of upper flange 58 and guide 59, and lower flange 60 and guide 61 which form a generally funnel-shaped passageway preventing improperly engagement of film 11 in the film channel of aperture plate 28.

At this point, when the threading operation is completed and the knob 17 reaches the extreme point of its rotation, an electric switch (not shown) is actuated, which turns on a motor that drives the projector mechanism through pulley 62. Film 11 is then pulled by sprocket 22 which takes up the slack between sprocket 22 and pressure roller 31, while the film that is being advanced intermittently by the shuttle 63 forms the loop 64 between aperture plate 28 and pressure roller 31, with roller 65 used to direct the loop into the desired position as shown in FIG. 3.

In the meantime, loop 57 is maintained in the position shown in FIG. 3 in order to absorb the intermittent motion of film 11 between aperture plate 28 and upper sprocket 21. During the running operation, rollers 23 and 24 act as film guides to keep the film properly engaged with upper sprocket 21, and rollers 26 and 27 do the same with respect to lower sprocket 22. The moving film is made to pass over guide rail 66 which constitutes the sound head in which the sound is picked up by means of sound lens 67 and its associated components (not shown). The uniform motion of the film, at this point, is maintained by the sound stabilizer drum 30 which is coupled in a conventional manner to a massive fly wheel which is not shown in the figures.

The operation of sprockets 21 and 22, shown and described in connection with FIGS. 2 and 3, takes place through the movement of the gear trains shown in FIGS. 4 and 5. FIG. 4 shows the gears in the threading or loading position at the beginning of the threading operation. When the knob 17 is rotated in a clockwise direction, arms 48 and 49 move in the direction of arrows 68 and 69, and pinions 52 and 53 ride over the teeth of gears 50 and 51, respectively, which at this point in the threading process remain stationary, thus causing sprockets 21 and 22 to move and engage the film, as described previously. At the end of this part of the operation, with control knob 17 at almost its extreme clockwise position, the gears are in the position shown in FIG. 5. At this point, with the film already engaged and the loops in the film formed, a motor is switched on and the gear train commences operation by the movement of the pulley 62 and worm 70, which transmits movement to pinions 52 and 53 through worm gears 71 and 72 and gears 50 and 51, thereby continuously operating sprockets 21 and 22 enabling the passage of film 11 through the projector.

Figure 6:
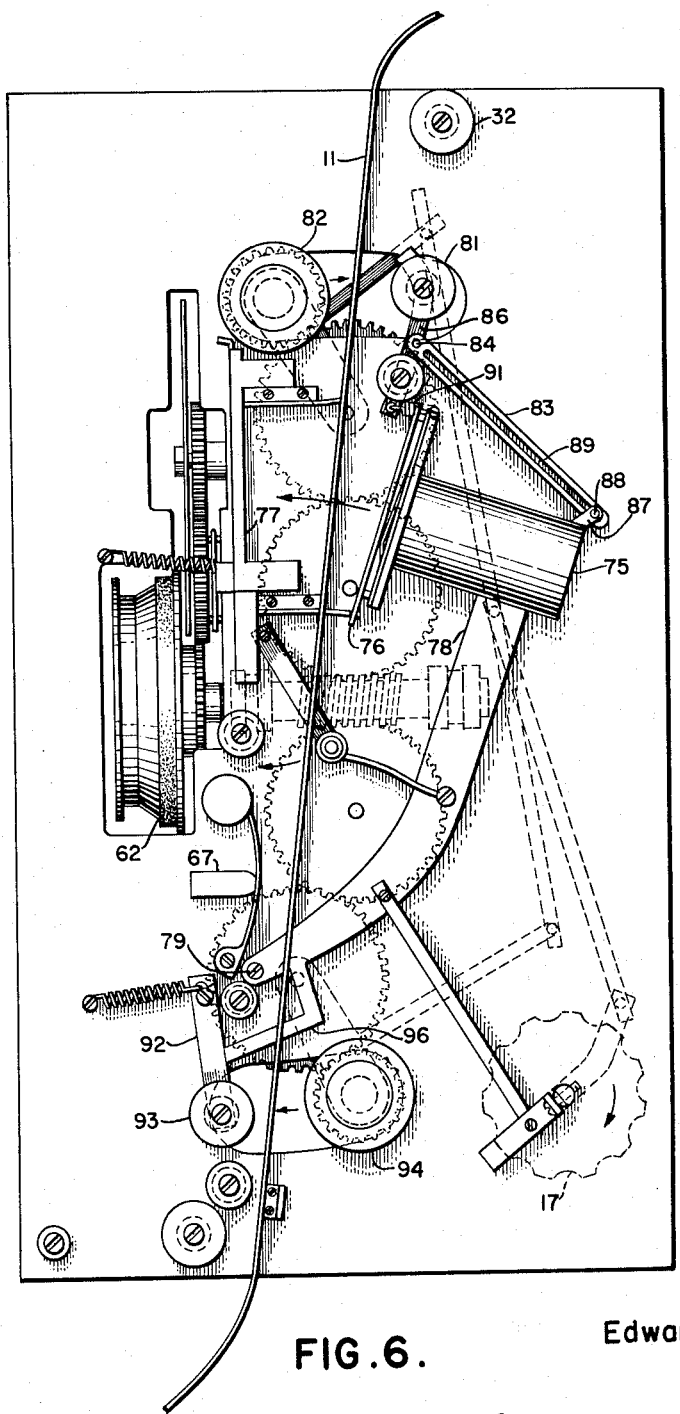
FIGS. 6 and 7 are another embodiment of the present invention with the mechanism in the threading and operating positions, respectively.
Figure 7:
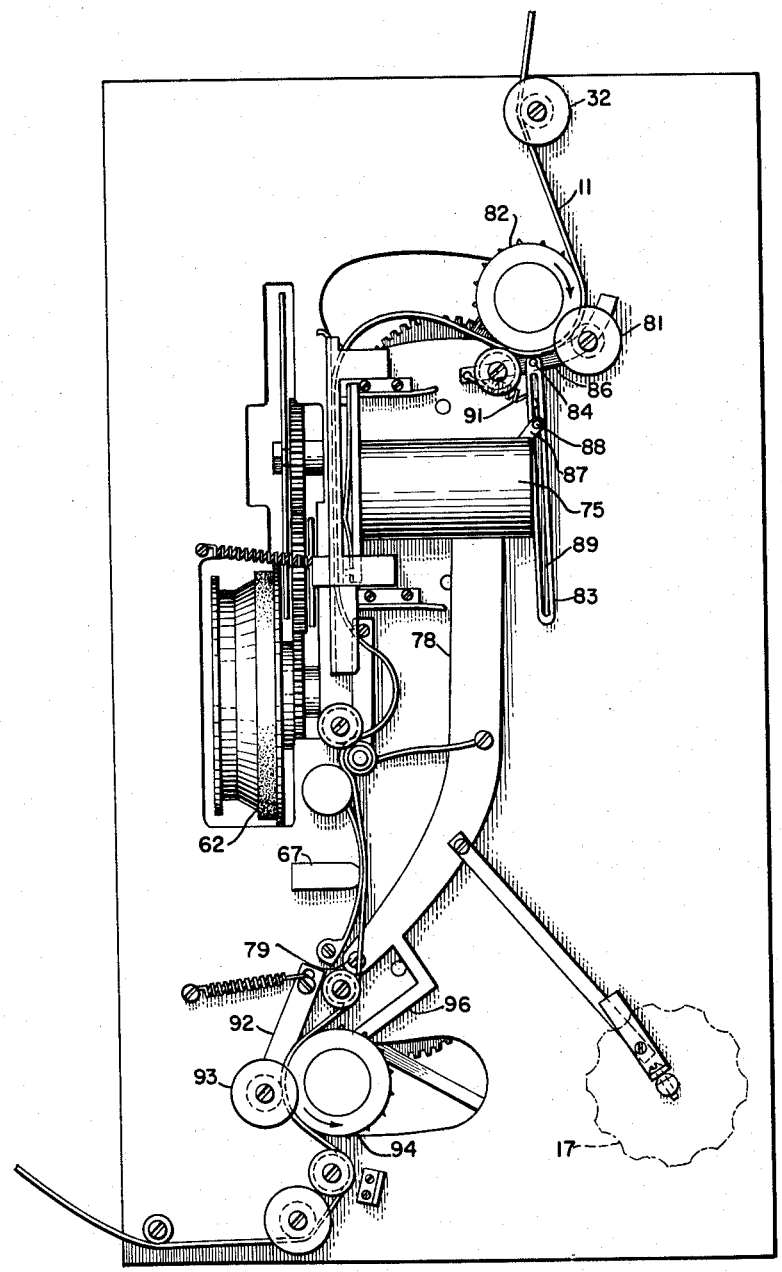

FIGS. 6 and 7 disclose another embodiment of this invention wherein the lens holder 75 and pressure plate 76 are swung away from the aperture plate 77 by the motion of arm 78 pivoted at point 79 through the action of linkage similar to that described in connection with the previous figures. In this embodiment, roller 81 is held away from upper sprocket 82 by means of a slotted bar 83 pivoted at point 84 on arm 86.

The other end of slotted bar 83 is attached to flange 87 on lens holder 75 having a pin 88 which passes through slot 89 in slotted bar 83. In the threading or loading position shown in FIGURE 6, pin 88 has slid along slotted bar 83 and is positioned at an extreme end of slot 89, thereby causing bar 83 to exert a force on arm 86 against the action of spring 91 holding roller 81 out of contact with sprocket 82. Arm 92, upon which roller 93 is mounted, is held out of contact with sprocket 94 by means of extension 96 on arm 78 in a manner similar to the operation of extension 35 on arm 37 in the embodiment depicted in FIGS. 2 and 3.

In the operating position shown in FIG. 7, pin 88 slides in slotted bar 83, thereby removing the force holding arm 86 against the force of spring 91 and allowing arm 86 to swing freely when pushed by sprocket 82. The remaining aspects of the operation of this embodiment are similar to those described in connection with the operation of the embodiment shown in FIGS. 2 and 3.

Additional embodiments of the invention in this specification will occur to those skilled in the art, and therefore it is intended that the scope of the invention be limited only by the appended claims and not by the embodiments described hereinabove.

What is claimed is:

1. A motion picture projector comprising a first sprocket, a first film guide means in cooperating adjacent relationship with said first sprocket during operation of the projector, a second sprocket, a second film guide means in cooperating adjacent relationship with said second sprocket during operation of the projector, an apertured plate located in the region between said first and said second sprockets, a source of light passing its illumination through the opening in said apertured plate, a lens holder located in the line of illumination passing through the opening in said apertured plate during operation of the projector, a pressure plate mounted in opposing relationship with said apertured plate, a positioning means connected so as to reposition said first sprocket, said pressure plate and said second sprocket for loading of a substantially straight line section of film into the projector during the threading operation, a first pinion mounted to turn with said first sprocket, and a second pinion mounted to turn with said second sprocket, said positioning means including control means and linkage means connecting said control means and said first and second pinions for controlling movement of said first and second pinions and thereby positioning of said first and said second sprockets, said sprockets being rotated while being moved to the operating position, whereby loops are formed in said section of film.

2. The motion picture projector of claim 1 further characterized by the addition of means for the takeoff of sound from the film, said means including a sound stabilizer drum and a pressure roller acting in cooperating adjacent relationship with said stabilizer drum during operation of the projector, and means to reposition said pressure roller whereby a substantially straight line section of film may be loaded into the projector during the threading operation.

3. A motion picture projector comprising a first sprocket, a first film guide means in cooperating adjacent relationship with said first sprocket during operation of the projector, a second sprocket, a second film guide means in cooperating adjacent relationship with said second sprocket during operation of the projector, an apertured plate located in the region between said first and said second sprockets, a source of light passing its illumination through the opening in said apertured plate, a lens holder located in the line of illumination passing through the opening in said apertured plate during operation of the projector, a pressure plate mounted in opposing relationship and with said apertured plate, a plurality of sections of control linkages connected so as to reposition said first sprocket, said pressure plate and said second sprocket for loading of a substantially straight section of film into the projector in the threading position, a motor means, gear means rotated by said motor means during operation of the projector, said gear means including a worm rotated by said motor means, a pair of worm gears rotated by said worm, and a pair of gears with each of said gears adjacent to and rotated by each of said worm gears, a pair of arms with one each of said arms pivoted at one end at the center of each one of said gears, a pair of pinions with each of said pinions mounted to move with one of each of said first and said second sprockets and adjacent to and rotated by the edge of each of said gears adjacent thereto, one of each of said pinions mounted for rotation on the other end of each of said arms from the pivoting end of each of said arms, said sections of control linkages connected to pivot said arms, each of said pinions riding over the edge of each of said gears while said arms are being pivoted, whereby said sprockets are rotated so that loops are formed in said section of film.

4. The motion picture projector of claim 3 further characterized by the addition of means for the takeoff of sound from the film, said means including a sound stabilizer drum and a pressure roller acting in cooperating adjacent relationship with said stabilizer drum during operation of the projector, and means to reposition said pressure roller whereby a substantially straight line section of film may be loaded into the projector during the threading operation.

5. A method of loading film into a motion picture projector which comprises placing a substantially straight strip of film in a slot between rotating film moving means and film guide means and between aperture plate and pressure plate, repositioning said film moving means and said pressure plate from a threading position to an operating position in order to engage the film between said film moving means and said film guide means and between said aperture plate and said pressure plate, and imparting a rotating action to said film moving means whereby loops are formed in said strip of film, said rotating action being independent of and additional to the regular rotation of said film moving means in the operating position.

References Cited in the file of this patent

UNITED STATES PATENTS

| 2,051,036 | Foster | Aug. 18, 1936 |
| 2,227,259 | Hokanson | Dec. 31, 1940 |
| 2,472,143 | Briskin | June 7, 1949 |

FOREIGN PATENTS

| 1,243,461 | France | Sept. 5, 1960 |